March 25, 1930. H. CLORAN 1,752,233
EYESHIELD OR GUARD FOR USE IN CONNECTION WITH
SPECTACLES, EYEGLASSES, GOGGLES, OR THE LIKE
Filed Nov. 13, 1928
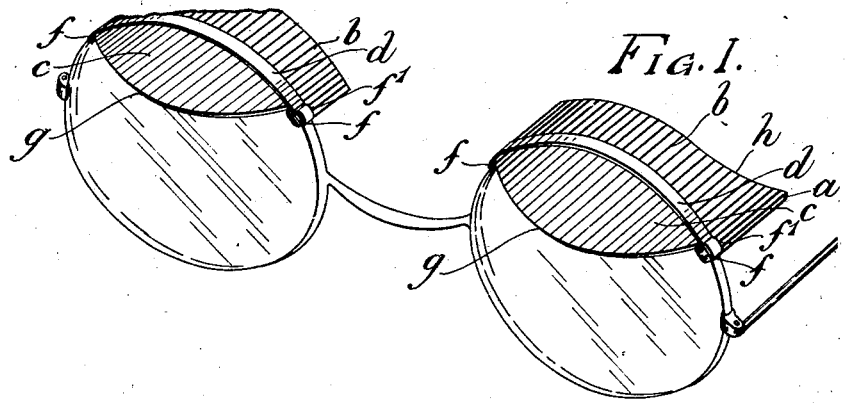
FIG. 1.
FIG. 2.
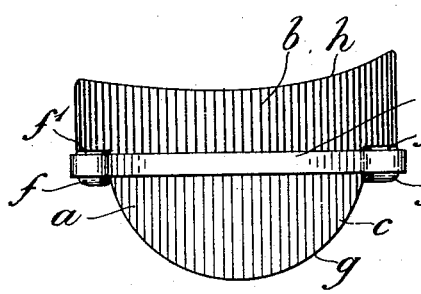
FIG. 3.
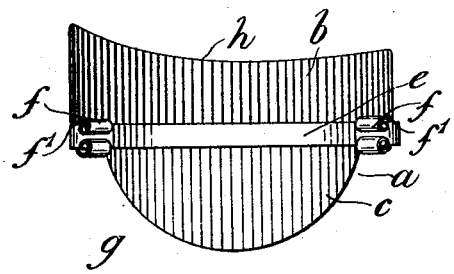
FIG. 4.
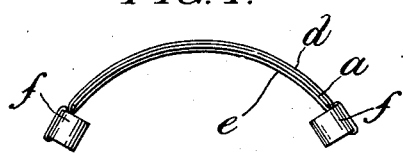
FIG. 5.
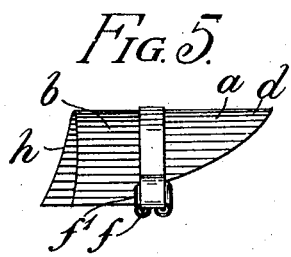
FIG. 6.
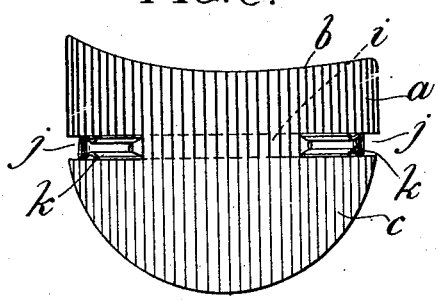
FIG. 7.
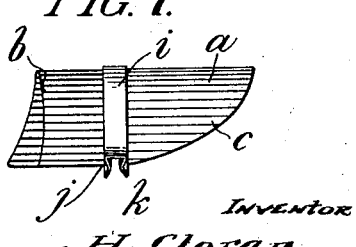
INVENTOR
H. Cloran.
By Lacey & Lacey, Attys Patented Mar. 25, 1930

1,752,233

UNITED STATES PATENT OFFICE

HENRY CLORAN, OF AMBLESIDE, ENGLAND

EYE SHIELD OR GUARD FOR USE IN CONNECTION WITH SPECTACLES, EYEGLASSES, GOGGLES, OR THE LIKE

Application filed November 13, 1928, Serial No. 319,125, and in Great Britain November 17, 1927.

This invention refers to improvements in or relating to shields or guards for use in connection with spectacles, eye-glasses, goggles or the like, and it has for its primary object to provide a guard or shield of improved and simplified construction which when used, as by motorists, sportsmen or other persons, will not only give ample protection against glare to the eyes, but will at the same time enable bright lights such as the glare from the headlights of an oncoming vehicle to be approached and even viewed without risk.

According to this invention, the improved shield or guard comprises a crescent or like shaped plate adapted to be detachably secured to the rims of spectacles, eyeglasses, goggles or the like and so constructed as to extend rearwardly from the plane of the lenses or glasses towards the forehead of the wearer and also to extend forwardly from the plane of the said lenses or glasses.

In order that the invention may be readily understood and carried into practical effect the same will now be described, by way of example, with reference to the accompanying drawing, in which:—

Figure 1 is a perspective view showing a pair of spectacles having applied thereto a pair of shields or guards embodying the invention;

Figure 2 is a top plan view of the guard detached;

Figure 3 is an inverted plan view thereof;

Figure 4 is a front end view;

Figure 5 is a side view, and

Figures 6 and 7 are similar views to Figures 3 and 5 respectively but showing a modification.

Referring first more particularly to Figures 1 to 5 inclusive, of the drawing, there is provided as an attachment to the upper portion of the rims of spectacles, eyeglasses and the like a somewhat crescent-shaped guardplate $a$ which is bent to the curvature of the upper portion of the lenses or glasses and which whilst reaching back from the plane of the lenses towards the forehead of the wearer also extends forwardly from the plane of the lenses to form a front guard. The rear portion $b$ of the guard behind the plane of the lenses is preferably rendered more or less opaque as by the application of a dark green varnish or lacquer whilst the front portion $c$ of the guard projecting in front of the plane of the lenses is preferably also tinted with a suitable green varnish or lacquer but of a density just sufficient to render the same more or less semi-transparent. However, the guard may be composed of a more or less semi-transparent material which may be treated so as to render the rear part of the guard more or less opaque. Thus when the shields or guards are applied to the upper portions of the glasses or lenses as shown in Figure 1, they will be found to completely shut off all light tending to pass down behind the lenses, while allowing the front portion to be used by the wearer to screen all bright lights as when viewing bright objects or when approaching the headlights of an oncoming vehicle.

The shields or guards preferably only extend around the upper portion of the upper edges of the rims or lenses so as to give a practically unobstructed lateral field of vision to the wearer. Conveniently the shields or guards may be each held or clamped in between a pair of bands or strips $d$, $e$ of spring steel or other metal or other suitable material, the said strips terminating at their extremities in a pair of spaced clamps $f$ which are adapted to clip over the metal rims of the glasses or to engage on opposite sides of the edges of the glasses themselves in the case of rimless spectacles and the like, the said clamps resting against stops or shoulders $f'$ afforded by the portion $b$ of the guard. Thus in this construction the bands $d$, $e$ form the dividing lines which correspond with the position occupied by the rims or edges of the glasses and which serve to divide the more or less opaque portion $b$ of the guards behind the lenses from the semi-transparent portion $c$ of the guards in front of the lenses.

The front or convex portion of the guards preferably resembles in shape a segment of a circle such as indicated at $g$ whilst the rear or concave portions are preferably shaped, such as indicated at $h$, to suit individual wearers, being designed to close the space between the plane of the lenses and the forehead of the wearer.

The modified form of guard shown in Figures 6 and 7 is substantially the same as that above described with reference to Figures 1 to 5, inclusive, except that a single band $i$, in lieu of the two bands $d$, $e$ aforesaid, is employed, the said band being bent downwardly and inwardly at the ends thereof and engaging retaining notches $j$ in the guard, the extremities of the band being provided with clamps $k$ for the purpose above mentioned in connection with the said bands $d$, $e$.

Having now fully described and ascertained my said invention, and the manner in which it is to be performed, I declare that what I claim is:—

An attachment for eye glasses comprising a shield having shoulders formed in its side edges, a pair of resilient strips extending transversely of the shield and upon opposite faces thereof, clamps fixed to the ends of the strips and adapted to abut said shoulders to limit the sliding movement of the shield in one direction between the strips, said clamps being adapted to detachably engage the rim of the eye glass.

In testimony whereto I have hereunto signed my name.

HENRY CLORAN.